US010783548B1

(12) United States Patent
Bhowmick et al.

(10) Patent No.: US 10,783,548 B1
(45) Date of Patent: Sep. 22, 2020

(54) CONTENT VIEWABILITY DETECTION

(71) Applicant: Amazon Technologies, Inc., Reno, NV (US)

(72) Inventors: Diptendu Bhowmick, West Bengal (IN); Ashwin Devendrappa Tengli, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 1183 days.

(21) Appl. No.: 15/061,824

(22) Filed: Mar. 4, 2016

Related U.S. Application Data

(63) Continuation-in-part of application No. 14/815,056, filed on Jul. 31, 2015.

(51) Int. Cl.
*G06Q 30/02* (2012.01)

(52) U.S. Cl.
CPC ..... *G06Q 30/0242* (2013.01); *G06Q 30/0277* (2013.01)

(58) Field of Classification Search
CPC ............... G06Q 30/0242; G06Q 30/0277
USPC ............... 705/14.69, 14.41; 709/224
See application file for complete search history.

(56) References Cited

U.S. PATENT DOCUMENTS

| 10,037,552 B1 | 7/2018 | Lorimor et al. |
| 2011/0029393 A1 | 2/2011 | Apprendi et al. |
| 2011/0296009 A1* | 12/2011 | Baranov ............... G06Q 30/02 709/224 |
| 2011/0320529 A1 | 12/2011 | Mentchoukov et al. |
| 2013/0185164 A1 | 7/2013 | Pottjegort |
| 2014/0180829 A1* | 6/2014 | Umeda ............. G06Q 30/0273 705/14.69 |
| 2014/0281901 A1 | 9/2014 | Mostowy et al. |
| 2015/0081406 A1 | 3/2015 | Matsubara et al. |
| 2015/0089542 A1 | 3/2015 | Sumitomo et al. |
| 2015/0169521 A1 | 6/2015 | Leventhal et al. |

FOREIGN PATENT DOCUMENTS

WO   WO-2010141835 A1 * 12/2010 ............. G06Q 30/02

OTHER PUBLICATIONS

George Ivie, The Viewable Impression: The First Step to an Audience-Based Digital Currency, 2015 (Year: 2015).*
Non-Final Office Action issued in co-related U.S. Appl. No. 14/815,056 dated Oct. 3, 2018.

* cited by examiner

*Primary Examiner* — Tarek Elchanti
(74) *Attorney, Agent, or Firm* — Hogan Lovells US LLP

(57) ABSTRACT

Various approaches enable the detection of "viewed" content. For example, in digital advertising, when a user visits a web page, the web page can be rendered with an advertisement. Content is considered viewable when a user is given enough opportunity to view the content. Approaches described herein attempt to determine whether a user was given an opportunity to view such of such content by determining and using at least one of a viewability metric, performance activity level metric, snapshot of the content, or combination thereof.

17 Claims, 9 Drawing Sheets

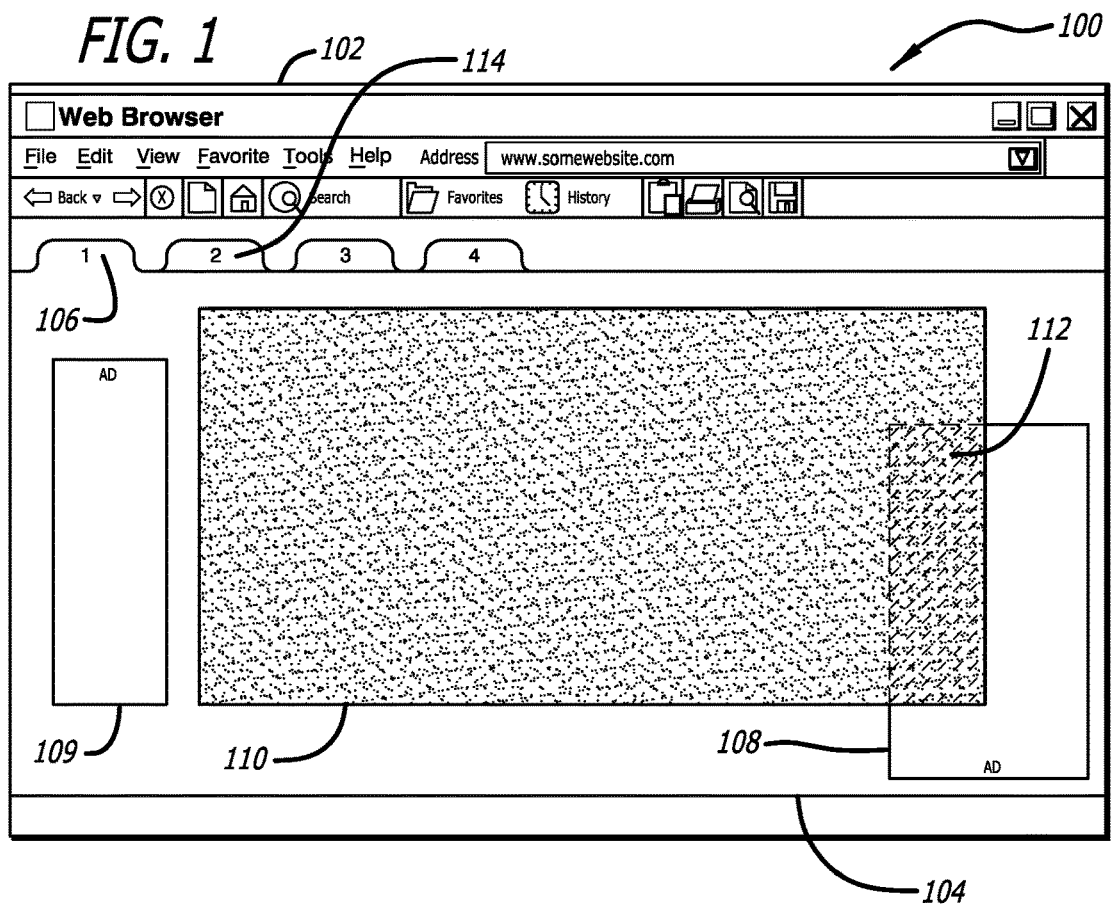
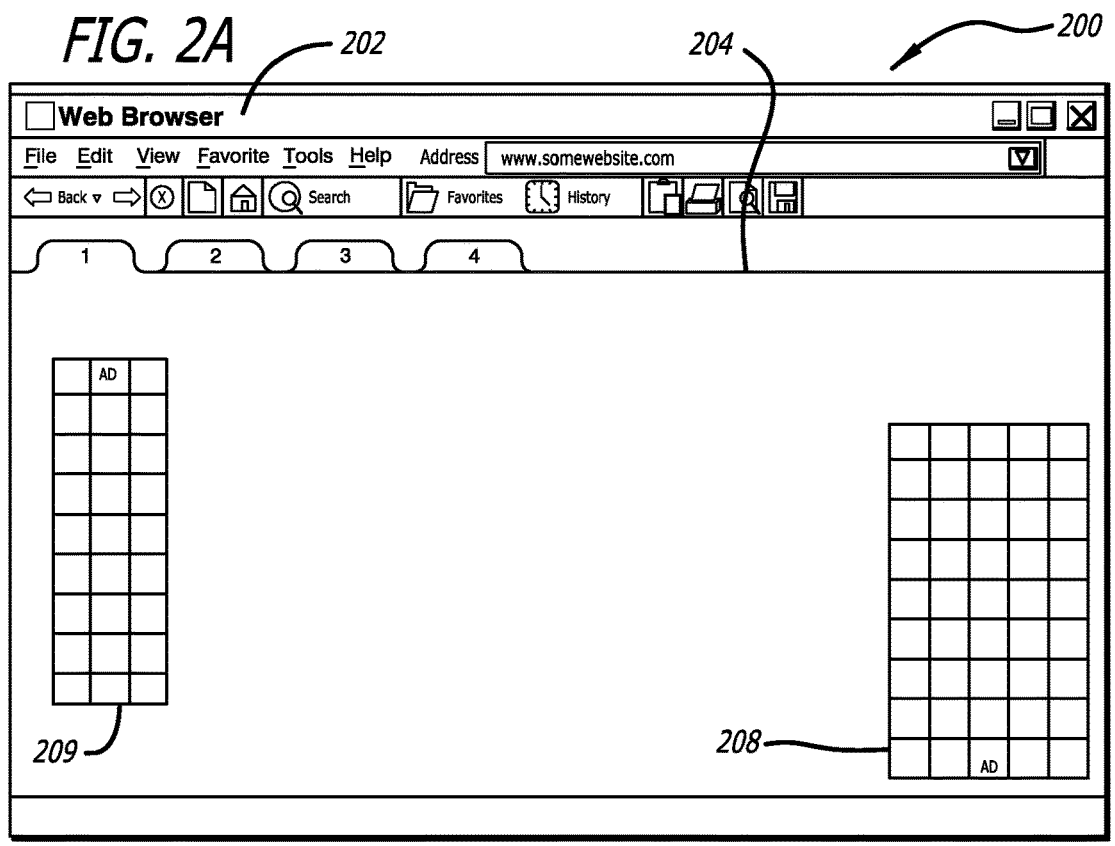

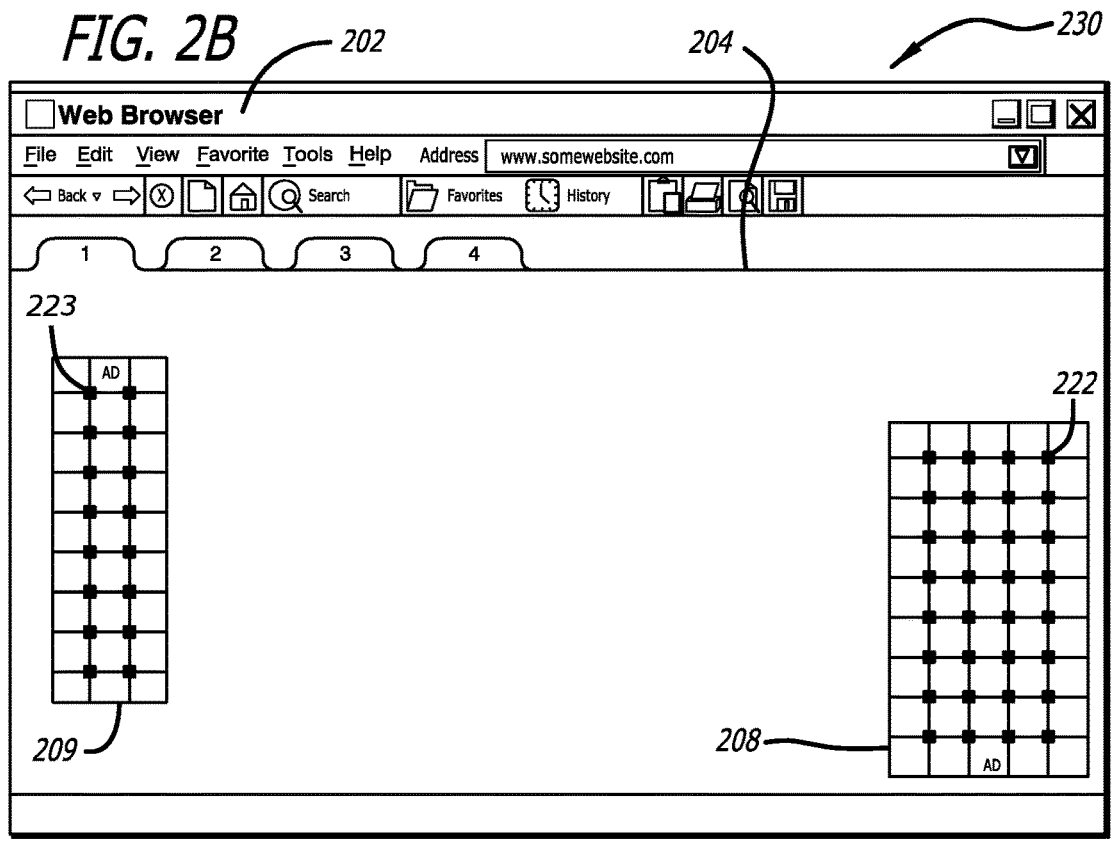
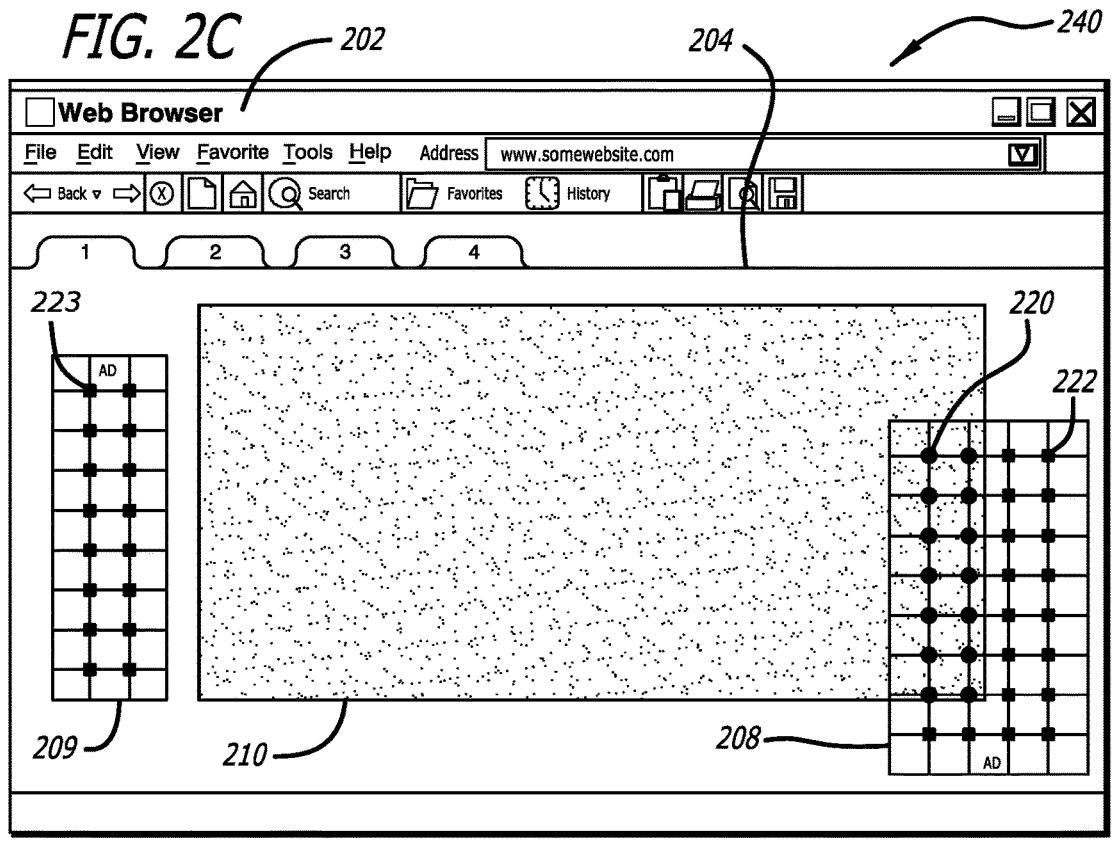

CONTENT VIEWABILITY DETECTION

CROSS-REFERENCE TO RELATED APPLICATIONS

This application is a continuation-in-part of U.S. patent application Ser. No. 14/815,056; entitled "CONTENT VIEWABILITY DETECTION" filed Jul. 31, 2015 which is incorporated herein by reference for all purposes.

BACKGROUND

Traditionally, advertisers have used a variety of different media to deliver their messages, including magazines, newspapers, billboards, television, radio, etc. More recently, advertisers have started to utilize interactive electronic media. For example, advertisements may be placed alongside web pages being displayed on a web browser, alongside recorded television programming that is being displayed by a digital video recorder, alongside content that is being displayed on a mobile device, etc.

There are many different kinds of advertisements that may be used in connection with interactive electronic media. Some advertisements are text-based. Other advertisements may utilize rich media advertising techniques such as color, imagery, page layout, interactive elements, video, and other elements in order to attract the reader's attention. In many of the advertising techniques used, an advertisement has value to an advertiser when that advertisement is viewed, or at least displayed with the opportunity of being viewed. However, whether a user has viewed or had an opportunity to view an advertisement can be difficult to measure. A number of conventional approaches attempt to measure viewability (i.e., whether a viewer has had an opportunity to view an advertisement). However, oftentimes, these approaches are responsible for large discrepancies in viewability, which can be frustrating to advertisers looking to ensure that viewability rates are for advertisements that were actually "in view" and don't include advertisements that were not measurable. Further, while consistent reporting across multiple advertising campaigns is essential, other insights beyond viewability, such as fraud detection, content quality and pre-bid viewability in real-time bidding (RTB) ad exchanges are important.

BRIEF DESCRIPTION OF THE DRAWINGS

Various embodiments in accordance with the present disclosure will be described with reference to the drawings, in which:

FIG. 1 illustrates an example environment in which aspects of the various embodiments can be utilized;

FIGS. 2A, 2B, and 2C illustrate an example situation of determining viewability of content in accordance with an embodiment;

DETAILED DESCRIPTION

Figure 3:
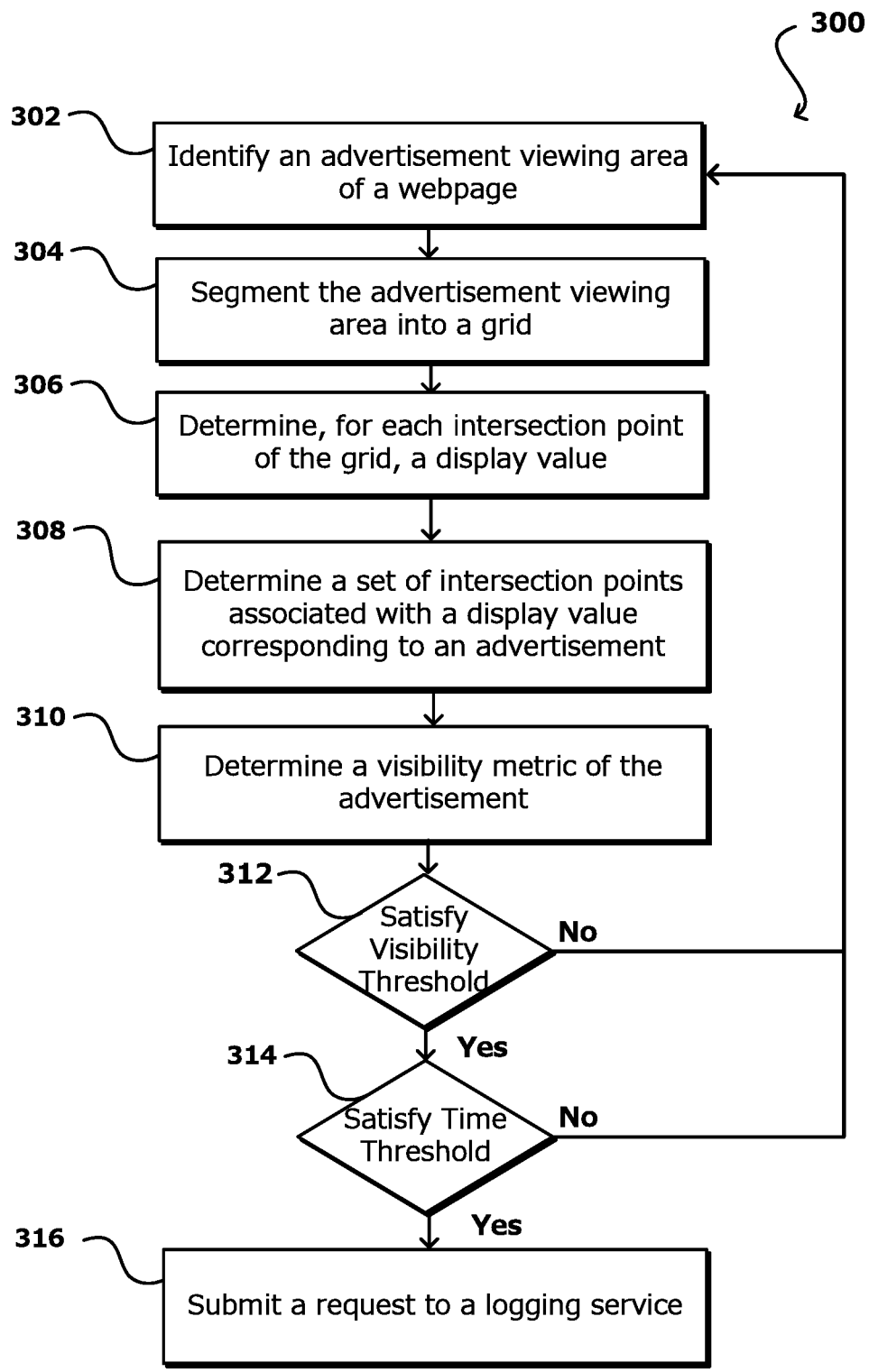
FIG. 3 illustrates an example processes for determining viewability of content in accordance with various embodiments.

Systems and methods in accordance with various embodiments of the present disclosure overcome one or more of the above-referenced and other deficiencies in conventional approaches to determining fraudulent activity as it relates to the source of content and whether content has been viewed, or at least displayed with the opportunity of being viewed. In accordance with various embodiments, when a user visits a web page, or other such page or application that displays content, the web page can be rendered with advertisements and/or other content. Approaches described herein can attempt to determine whether the user was given an opportunity to view such content by determining and utilizing at least one of a viewability metric, performance activity, a snapshot of the content, or combination thereof.

In accordance with various embodiments, a component operating on a computing device, a script executing on web browser, or other software code or application, can be used to determine a viewability metric, performance activity, or a snapshot of content that can be used to determine whether content has been "viewed." For example, in accordance with various embodiments, a computing device can be configured to identify an advertisement viewing area of a web page, where the advertisement viewing area can be used to display an advertisement on a display screen of the computing device. The advertisement viewing area can be segmented into a grid that includes a plurality of intersection points. For each intersection point, a display value can be determined, which can correspond to the advertisement or a display element other than the advertisement, such as an overlay or popup. A set of intersection points from the grid corresponding to the advertisement can be determined. The visibility metric of the advertisement can be determined as the ratio of number of intersection points belonging to the advertisement and a total number of the plurality of intersection points. If the visibility metric meets a visibility threshold (e.g., 50% visible) for a threshold period of time (e.g., 1 second), the advertisement can be considered as viewable.

In another approach, a test element can be positioned in a location on the advertisement viewing area. As the web page renders, performance activity associated with the test element can be determined. The performance activity can be compared to a threshold performance level to determine viewability of the advertisement. For example, in the situation where it is determined that the performance activity does not meet the threshold performance level, a request to a logging service indicating that the advertisement is not viewable can be submitted. In the situation where it is determined that the performance activity meets the threshold performance level, a request can be submitted to a logging service indicating that the advertisement is viewable.

In certain embodiments, it may be desirable to determine whether the publisher is attempting to fraudulently display content on a web page. This can include, for example, determining whether a user was given an opportunity to view such content on a web page. Such an approach can include utilizing a snapshot of the content to determine whether content has been "viewed." For example, in accordance with various embodiments information used to render a potential advertisement in the advertisement viewing area can be determined. The information can be compared to stored information to determine a similarity score between the potential advertisement and a verified image of the advertisement. The similarity score can be compared to a threshold similarity score to determine whether the potential advertisement is potentially fraudulent. In the situation where it is determined that the similarity score does not meet a threshold similarity score, it can be determined that the potential advertisement is potentially fraudulent and a request to a logging service indicating that the potential advertisement is potentially fraudulent can be submitted. In the situation where it is determined that the similarity score meets a threshold similarity score, it can be determined that the potential advertisement is not fraudulent and a request to a logging service indicating that the potential advertisement is not fraudulent can be submitted.

Various other functions and advantages are described and suggested below as may be provided in accordance with the various embodiments.

FIG. 1 illustrates an example environment 100 in which aspects of the various embodiments can be utilized. The example environment 100 illustrates a web browser or other web viewer 102 that is configured to electronically access content (e.g., a website or web page) from a publisher. In accordance with various embodiments, content publishers ("publishers") can create opportunities for displaying electronic advertisements ("ads") with their content (e.g., web pages). Publishers can provide such opportunities independently or be represented by an advertisement network ("ad network"). For example, when a user accesses a website of a publisher, the server hosting the website can send an advertisement request to an advertisement exchange ("ad exchange"). This request may include information describing the website, publisher, and/or the user. Once the request is received by the ad exchange, advertisers can bid to fill that request with their advertisement and an advertisement can be provided and displayed on the web browser.

For example, as shown in example 100 of FIG. 1, a web page 104 of web browser 102 is displayed. The web browser, in this example, can have (or be configured to open) a number of tabs (e.g., tabs 106 and 114), where each tab can be used to access content. For example, as shown, tab 106 can be used to display web page 104, advertisements 108 and 109, and content 110. For example advertisement 109 is viewable since it is not blocked or otherwise obstructed, and is displayed for at least a threshold period of time. Advertisement 108 may not be viewable given that a portion of the advertisement is blocked by content 110.

In certain conventional approaches, digital advertising is measured if an advertisement is served, not if the advertisement is on the display screen long enough for a user to see it ("visible"). However, a problem with measuring advertising by whether an advertisement is served is the likelihood of advertisement fraud. Advertisement fraud is the deliberate practice of attempting to serve advertisements that have no potential to be viewed by a human user. An example of advertising fraud can occur when advertisements to be served are served to background tabs, such as background tab 114, or are otherwise served and processed by a background process and the user is not given an opportunity to view the advertisement. An example background process includes, for example, determining a time to render the advertisement and determining that the time is less than a threshold amount of time. The situation that the time is less than the threshold amount of time the advertisement is considered viewable. As would be understood to one skilled in the art, the threshold amount of time can be any determined amount of time. Further, in some situations, the advertisement is viewable when the advertisement is rendering faster than a threshold amount of time. In either situation, the advertisement is not viewed by the user, nor is there an opportunity for the user to view the advertisement. Another example of advertising fraud could be a scenario where an advertisement is blocked or obstructed in such a way that the advertisement cannot be viewed by the user, or at least a threshold area of the advertisement cannot be viewed. This can occur when, for example, the advertisement is resized to a small dimension (e.g., 1 pixel by 1 pixel), or content is overlaid on the advertisement. An example of blocking or otherwise obstructing the display of an advertisement is illustrated in FIG. 1. As shown, content 110 blocks a portion of advertisement 108. The portion blocked, 112, may prevent the user from viewing the advertisement in such a way that the advertisement is considered viewed. Such a situation is not desirable to advertisers where under conventional standards credit is given for serving the advertisement, and in this example, credit may be given even though the user may never see the advertisement or at least see a threshold area of the advertisement since the advertisement is blocked.

Accordingly, whether the user has viewed or had an opportunity to view an advertisement can be difficult to measure. Such a measurement can be referred to viewability. Viewability is an online advertising metric that aims to track only advertisements or other impressions that can actually be seen by users. For example, if an advertisement is loaded at the bottom of a web page but a user doesn't scroll down far enough to see it, that advertisement would not be deemed viewable. If an advertisement is blocked or display of that advertisement is obstructed, the advertisement may not be considered viewable. In this way, viewability is designed to let advertisers pay only for the advertisements that users could possibly see. It should be noted that any metric that is used to determine whether an advertisement or other content is viewed can be used and that metric can have any number of viewability criteria.

In accordance with various embodiments, viewability of an advertisement or other content can be determined by observing a set of criteria. The set of criteria can include, for example, viewable area of the content, display screen time of the content, etc. For example, an advertisement can be considered viewable when 50% of the advertisements pixels are in view on the display screen for a minimum of one second. It should be noted that the set of criteria for viewability can include more or fewer criteria, and the threshold or ranges of each criterion can be different than that described above.

A number of conventional approaches attempt to measure viewability. For example, page geometry attempts to measure viewability by computing it directly from geometric information gathered from the web page. The geometric information can include the size and relative placement of the web page, browser viewport, and advertisement. However, this approach suffers from many technical limitations, particularly if the advertisement is delivered within nested cross-domain iFrames. These iFrames are very common, and are used by both publishers and ad servers to prevent ads and other external content from intentionally or inadvertently interfering with websites. As a side effect, iFrames restrict access to the geometric data needed to compute viewability, leading to huge gaps in data collection.

In accordance with an embodiment, another approach, panels, relies upon a small group of people who have installed software on their device to measure viewability directly. This has all of the well-known problems of using a small group to stand in as representative for the whole. Many applications of viewability (including vCPM pricing, attribution and frequency capping) require data for most if not all advertisements, which cannot be delivered by this method. In accordance with an embodiment, in yet another approach, behavioral proxy, infers viewability for advertisements that cannot be measured otherwise by detecting user actions that occur only when an advertisement is viewable. For example, by tracking mouse movement it can be inferred that any advertisement where the mouse passed over must have been in view during that moment. In addition to the panel drawbacks, this measure also introduces biases related to the specific placement of the advertisement. For example, advertisements located in the upper left corner of a website may be inadvertently moused over far more frequently than advertisements placed in the upper right hand corner. Additionally, a user may not perform any measurable action on a web page, even when the advertisement is viewable the entire time they browse. In accordance with an embodiment, in yet another approach, browser exploits, bypass the limitations of iFrames by taking advantage of security weaknesses in a given browser version. These loopholes are usually specific to a single browser, and will stop working as soon as the browser manufacturer patches the security hole (and they usually do). Furthermore, circumventing the iFrame also means circumventing the publisher's safeguards to protect their own usage data and potentially the user's personal data, as well as the integrity of the content of the web page. In accordance with an embodiment, in yet another approach, browser monitoring, monitors a browser's internal processes to determine if an advertisement is being rendered. The primary limitation is that it is very difficult to execute. Each browser manufacturer and version will have different approaches to optimizing content rendering that will vary by circumstance, operating system and device. Keeping track of all of this is a significant technical hurdle and ongoing quality assurance investment.

The above described conventional approaches are responsible for large discrepancies in viewability, which can be frustrating to advertisers looking to ensure that viewability rates are for advertisements that were actually "in view" and don't include impressions that were not measurable. Further still, while consistent reporting across multiple advertising campaigns is essential, other insights beyond viewability, such as fraud detection, content quality and pre-bid viewability in real-time bidding (RTB) ad exchanges are important. Accordingly, in accordance with various embodiments, determining whether content has been viewed, or at least displayed with the opportunity of being viewed, can include, for example, identifying a first content item displayed on a display screen of a computing device; identifying a plurality of interest points of an area that includes the first content item; determining, for each interest point of the plurality of interest points, a display value, the display value corresponding to one of the first content item or a second content item; determining a visibility metric of the first content item based at least in part on the display value for each interest point; and determining whether the first content item is viewable based at least in part on the visibility metric.

FIGS. 2A, 2B, and 2C illustrate an example situation of determining viewability of content in accordance with an embodiment. As shown in example 200 of FIG. 2A, web browser 202 is displaying advertisements 209 and 208 on web page 204. In accordance with an embodiment, advertisements 209 and 208 can correspond to advertisements 109 and 108 shown in FIG. 1. In this example, a component operating on a computing device, a script executing on the web browser, or an application or other software, can be used to identify an advertisement viewing area of the web page 204, where the advertisement viewing area can be used to display an advertisement on a display screen of the computing device. An advertisement viewing area ("ad slot") can be the area on a web page or other display area where an advertisement loads. The advertisement viewing area can be associated with a size. The size of the advertisement viewing area can be measured in pixels or some other unit of measurement. An example advertisement viewing area size can be 50 pixels by 50 pixels. The advertisement viewing area can be associated with a position on the web page. For example, the advertisement viewing area can be associated with coordinates (e.g., x, y coordinates) that can be used to describe the position of the advertisement viewing area on the web page.

The advertisement viewing area can be segmented into a grid. In accordance with an embodiment, the grid can include, for example, a plurality of intersection points, where each intersection point can correspond to an intersection on the grid. For example, as shown in FIG. 2A, advertisements 209 and 208 are segmented into a grid of squares. The squares shown are uniform in size and the density of the squares in the advertisement viewing area is relatively constant. It should be noted that the advertisement viewing area can be segmented into other shapes (e.g., rectangles). It should be further noted that the advertisement viewing area can be segmented into different shapes. For example, a first region of the advertisement viewing area can be segmented into squares, a second region of the advertisement viewing area can be segmented into rectangles, and a third region can be segmented into both squares and rectangles. It should be further noted that segmenting the grid into squares is just one way to generate a set of intersection points from a plurality of possible points on the grid. As would be understood to one skilled in the art, any one of a number of techniques can be used to determine the set of intersection or interest points.

As shown in example 230 of FIG. 2B, the intersection points (e.g. 222 and 223) correspond to an intersection on the grid. However, in accordance with various embodiments, the intersection points can correspond to an interest point or some other aspect of the advertisement viewing area. In this way, the advertisement viewing area can include a plurality of interest points or other points. The interest points can be spaced in the advertisement viewing area in a number of different ways. For example, the interest points can be uniformly spaced, randomly spaced, or spaced uniformly in some areas and randomly spaced in other areas. In accordance with an embodiment, an interest point can correspond to a point of reference in the advertisement viewing area and can be determined using any number of different interest point detection algorithms as would be understood to one skilled in the art.

For each intersection point, a display value can be determined. For example, as shown in example 240 of FIG. 2C, the display value for intersection point 223 of advertisement 209 can be determined, and the display value for intersection points 220 and 222 of advertisement 208 can be determined. The display value can be determined in a number of ways. In one way, for example, given a coordinate (x, y) on the display screen, the display value is the value of the content element visible on the display screen that contains the intersection point. In this example, the display value of intersection point 222 corresponds to advertisement 209. The display value of interest point 222 corresponds to advertisement 208. The display value of intersection point 220 corresponds to content item 210. This is because content item 210 is covering advertisement 208 at intersection point 220 and is therefore displayed on a higher layer than advertisement 208. In this way, content can be displayed at different layers, where content at a higher layer is positioned above content at a lower layer. The display value for stacked content corresponds to the content at the highest layer (e.g., the layer closest the display screen).

In accordance with an embodiment, the display value can be determined using a method call. For example, in some web browsers, the DOM API elementFromPoint( ) method of the document interface can return the topmost element at the specified coordinates. In this example, the topmost element corresponds to one of the advertisement or the content item; however, the topmost element can correspond to any one of a number of content items. In this example, the specified coordinates correspond to the intersection points; however, the coordinates can be any coordinates. It should be noted that various other approaches or combination of approaches that return the topmost element can be used as well within the scope of the various embodiments.

A set of intersection points from the grid corresponding to the advertisement can be determined. For example, for each advertising viewing area, a display value is determined for all or at least a portion of the intersection points of the respective advertising viewing area, and a total number of display value points for a corresponding advertisement viewing area is determined. As shown for advertisement 209, the display value for each one of the intersection points corresponds to advertisement 209. As shown for advertisement 208, the display value for a first set of the intersection points corresponds to the content and the display value for a second set of the intersection points corresponds to advertisement 208.

A visibility metric for each of the advertisements can be determined as a ratio of number of intersection points belonging to the advertisement and a total number of the plurality of intersection points for the advertisement viewing area of the advertisement. The visibility metric can be used to determine the viewable area of the advertisement. In this example, a visibility metric is determined for advertisement 209 and a visibility metric is determined for advertisement 208. When the advertisement is not fully viewable (i.e. the computed value of viewability is less than 1), the visibility metric can be compared to a visibility threshold. For example, in accordance with an embodiment, if the visibility metric meets the visibility threshold (e.g., 50% visible) for a threshold period of time (e.g., 1 second), the advertisement can be considered viewable. Example visibility thresholds include 50%, 40%, etc. and example threshold period of time includes 0.5 seconds, 1 second, etc. Various other thresholds can be used as well as should be apparent to one of ordinary skill in the art in light of the present disclosure. Advantageously, approaches described herein work in many environments, including environments that use cross domain iFrames. Moreover, as described, approaches advantageously can detect fraud scenarios like the situation where the advertising viewing area is hidden behind another content element or the situation where the advertisement has been placed inside a smaller sized container (1×1 pixel frame) with an intention of hiding it from the website visitor.

Furthermore, approaches described herein can appreciate increased accuracy of determining viewed advertisements because the various approaches determine the visible area based on the count of points and is not affected by other elements, content, or programs running on the computing device.

FIG. 3 illustrates an example process 300 for determining viewability of content in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a component operating on a computing device, a script executing on web browser, or other software code or application, can be used to determine a viewability metric that is indicative of whether content has been "viewed." For example, in accordance with various embodiments a computing device can be configured to identify 302 an advertisement viewing area of a web page, where the advertisement viewing area can be used to display an advertisement on a display screen of the computing device. The advertisement viewing area can be segmented 304 into a grid. In accordance with an embodiment, the grid can include, for example, a plurality of intersection points, where each intersection point can correspond to an intersection on the grid. For each intersection point, a display value can be determined 306. In accordance with an embodiment, the display value can correspond to the advertisement or a display element other than the advertisement, such as an overlay or popup. A set of intersection points from the grid corresponding to the advertisement can be determined 308. For example, given a coordinate (x, y) on the display screen, the display value that is visible on the display screen and contains the intersection point can be determined. The visibility metric of the advertisement can be determined 310 as the ratio of the set of intersection points and a total number of the plurality of intersection points. In this way, the visibility metric can correspond to the viewable area of the advertisement.

The visibility metric can be compared 312 to a visibility threshold. If the visibility metric meets the visibility threshold then it is determined 314 whether the visibility metric does not meet the visibility threshold for at least a threshold amount of time. Determining whether the visibility metric meets the visibility threshold for the threshold amount of time can be determined in a number of ways. In a first approach, steps 302-310 can be repeated for a predetermined number of times up to at least the threshold amount of time. The determined visibility metrics can be combined and averaged and the averaged visibility metric can be used in a final determination at the end of the threshold period of time. In another approach, a first visibility metric can be determined. If it is determined that the first visibility metric meets the visibility threshold a second visibility metric can be determined at the expiration of the threshold period of time and the second visibility metric can be compared to the visibility threshold.

If the visibility threshold in the first example or the second visibility threshold in the second example meets the visibility threshold, or the visibility threshold does not meet the visibility threshold for the threshold period of time, steps 302-314 can be repeated. Additionally or alternatively, at least one call or request can be submitted 316 to a least one logging service, within or outside a provider environment, where the call or request can include information about the visibility of the advertising and/or the presence of ad-blocking software, among other such options. The information can then be stored to a log data base or similar location for subsequent analysis. In some cases, the information in the log data store will periodically be pulled and transformed to a format that can be stored to a table in the user data store, or other data repository or data store, for reporting or statistical analysis with other data, enabling various types of reporting and analysis to be performed across various types of data.

Figure 4:
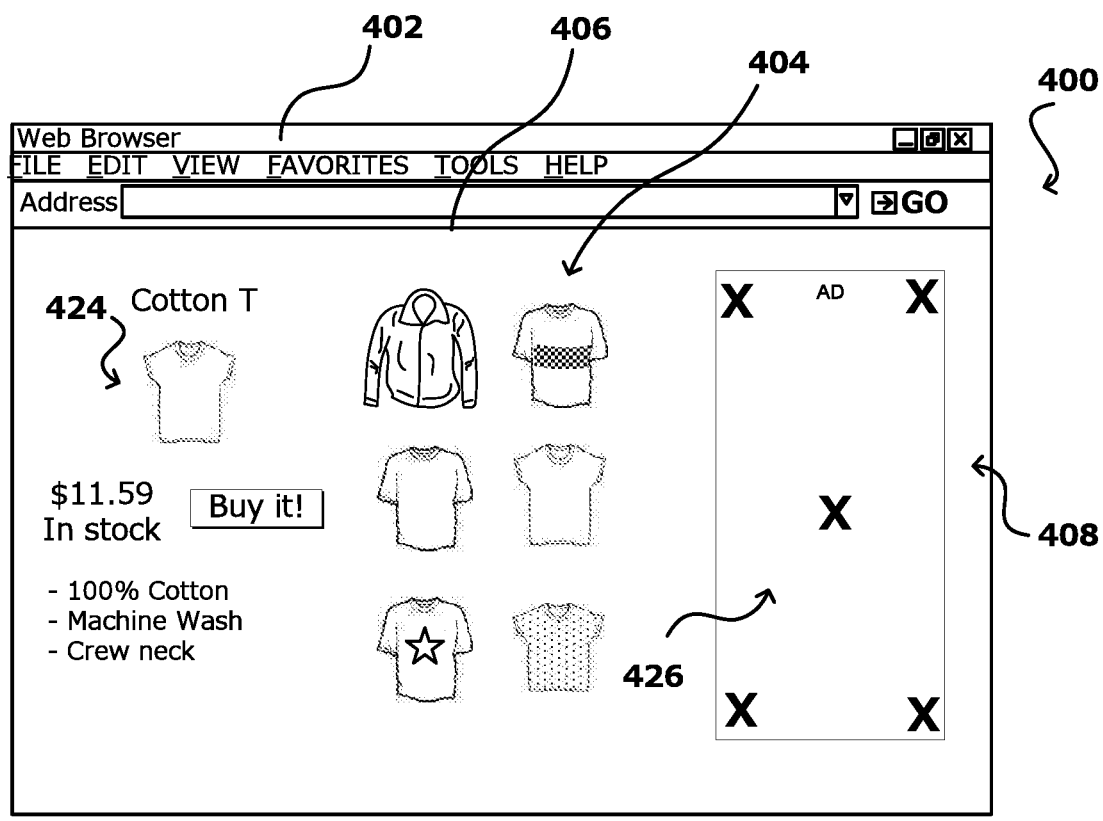
FIG. 4 illustrates an example situation of determining viewability of content using at least one test element in accordance with an embodiment.

FIG. 4 illustrates an example situation of determining viewability of content in accordance with an embodiment. As shown in example 400 of FIG. 4, web browser 402 is displaying products 404 on web page 406, a product listing 424 that includes an image of a product, a price listing of the product, a description of the product, and a selectable element to purchase the product, and an advertisement viewing area ("ad slot") 408 or other content viewing area. An advertisement viewing area ("ad slot") can be the area on a web page or other display area where an advertisement loads. In this example, approaches enable viewability detection that can be used when the ad slot is in-line to the web page as well as in the situation of real-time bidding (RTB) where the ad slot is placed inside multiple levels of frames (e.g., exchange iFrames) or some other container or area of a web page. Real-time bidding (RTB) is a means by which advertising inventory is bought and sold on a per-impression basis, via programmatic instantaneous auction, similar to financial markets. An iFrame (Inline Frame) is an HTML document embedded inside another HTML document on a website. The iFrame HTML element is often used to insert content from another source, such as an advertisement, into a Web page.

A web browser may include one or more components that may be responsible for rendering the web page. One such component includes a compositor component or other such user interface component. The compositor can "paint" the web browser window with the contents of the web page. Painting includes, for example, traversing a render tree, where the renderer's "paint( )" method is called to display content on a screen. A render tree may include visual elements in the order in which they will be displayed. The render tree can be the visual representation of the document (e.g., a HTML document that includes HTML files used to present the web page). The purpose of this tree is to enable painting the contents in their correct order.

In conventional systems, the compositor or other such component is implemented in software but oftentimes, because computers include Graphical Processing Units (GPUs), the GPU can be utilized to minimize frame render time so that a frame rate of 60 fps can be maintained consistently without excessive CPU cycles being used. In accordance with various embodiments, one approach to reduce frame render time is to optimize rendering of HTML elements that are outside the viewport (i.e., the browser window display area.) Thus, a paint command for some out-of-viewport element can be considered at lower priority than an on-screen element operation. In accordance with various embodiments, approaches can leverage such distinction to determine whether the ad slot is inside viewport and thus potentially viewable.

When displaying a web page, a web browser may refresh the web page at a predefined rate (e.g., 60 frames per second (fps)) during which a render process can be implemented. An example frame rendering process can include, for example, four phases. It should be noted, however, that more or fewer phases are possible. In this example, the four phases can include a style phase, a layout phase, a paint phase, and a composite phase. In the style phase, a web browser detects changes in Cascading Style Sheets (CSS) property values and updates a render tree. Cascading Style Sheets (CSS) is a style sheet language used for describing the presentation of a document written in a markup language, such as HTML. In the layout phase, dimension changes for any HTML element on the page creates a cascading effect along an ancestral chain in the Document Object Model (DOM) tree. For example, the web browser updates a line box layout tree and paints rectangles accordingly. An HTML element can be an individual component of an HTML document or web page. HTML is composed of a tree of HTML elements and other nodes, such as text nodes. Each element can have HTML attributes specified. The DOM can be a cross-platform and language-independent convention for representing and interacting with objects in HTML, XHTML, and XML documents. The nodes of every document are organized in a tree structure, called the DOM tree. Objects in the DOM tree may be addressed and manipulated by using methods on the objects. An ancestral chain includes a plurality of objects, where an object A is called an ancestor of an object B if and only if B is a descendant of A. In the paint phase, the web browser converts each paint rectangle to a bitmap and calls the graphics renderer to paint the frame on the display screen. In the composite phase multiple layers of bitmap image are combined together and rendered on the screen.

As described, conventional web browsers may have relied on the CPU to render web page content. With capable GPUs now an integral part of even the smallest of computing devices, GPUs can be utilized to achieve better performance as well as power savings. As described, the compositor can manage graphics layer trees and coordinate frame lifecycle. As further described, rendering occurs in two phases: a paint phase and a composite phase. This allows the compositor to perform additional work on a per-compositing-layer basis. For instance, the compositor is responsible for applying the necessary transformations (as specified by the layer's CSS transform properties) to each compositing layer's bitmap before compositing it. Further, since painting of the layers is decoupled from compositing, invalidating one of these layers only results in repainting the contents of that layer alone and recompositing. Every time the browser needs to make a new frame, the compositor draws. Note this terminology distinction: drawing is the compositor combining layers into the final screen image; while painting is the population of layers' backings (bitmaps with software rasterization; textures in hardware rasterization). The compositor can use the GPU to perform its drawing step. This is a significant departure from the old software rendering model in which the Renderer process passes (via IPC and shared memory) a bitmap with the page's contents over to the Browser process for display.

In the hardware accelerated architecture where a GPU is utilized, compositing occurs on the GPU via calls to the platform specific 3D APIs (D3D on Windows; GL everywhere else). The renderer's compositor is essentially using the GPU to draw rectangular areas of the web page (i.e. all those compositing layers, positioned relative to the viewport according to the layer tree's transform hierarchy) into a single bitmap, which is the final page image. In accordance with various embodiments, a test feature 426 can be introduced into the ad iFrame (e.g., the advertisement viewing area) and the compositor performance can be monitored to determine whether the ad slot is inside viewport. Such approach leverages the fact that the GPU tries to optimize compositor performance for elements that are outside viewport. The web browser provides compositor frame-timing details through, for example, a frame timing API of other such approach. This API can be invoked through the DOM window object and can provide the performance details in the context of that frame. In this example, the test feature is placed inside an iFrame so that the performance is not affected by any element from the ad creative. A separate thread monitors the performance at regular intervals (e.g., one second) and intimates the parent iFrame (e.g., AAX iFrame) when it finds the performance metric above a specified threshold.

The test feature can include, for example, multiple CSS properties applied to an HTML element. The idea is to amplify the part of rendering process that obfuscates out-of-viewport elements. Accordingly, given that this approach monitors GPU compositor performance in order to detect viewability, a particular set of CSS properties are selected as a test feature. As mentioned, all CSS properties do not go through the four phases of frame rendering (i.e., style, layout, paint, and composite.) For example, color change for an element does not require layout. In this example, to involve the compositor and to minimize CPU impact, CSS properties like opacity, color, among other properties that do not require layout or paint changes are changed.

In accordance with various embodiments, the test feature (s) can be placed at the intersection point of two diagonals to ensure that the ad slot is at least 50% viewable when this point is inside viewport. Other locations can include the four corners of the ad slot, one or more corners, or some other arrangement or combination of arrangements. The detection logic can be triggered every second or some other period of time to determine the value of viewability. In accordance with various embodiments, in the situation where the test feature is inside the viewport, the compositor frames are rendered and can be detected to indicate viewability of an ad included in the ad slot. In the situation where the test feature is outside the viewport, the compositor frames are not rendered and viewability is not detected. Thereafter, at least one call or request can be submitted to a least one logging service, within or outside a provider environment, where the call or request can include information about the visibility of the advertising and/or the presence of ad-blocking software, among other such options. The information can then be stored to a log data base or similar location for subsequent analysis. In some cases, the information in the log data store will periodically be pulled and transformed to a format that can be stored to a table in the user data store, or other data repository or data store, for reporting or statistical analysis with other data, enabling various types of reporting and analysis to be performed across various types of data.

Figure 5:
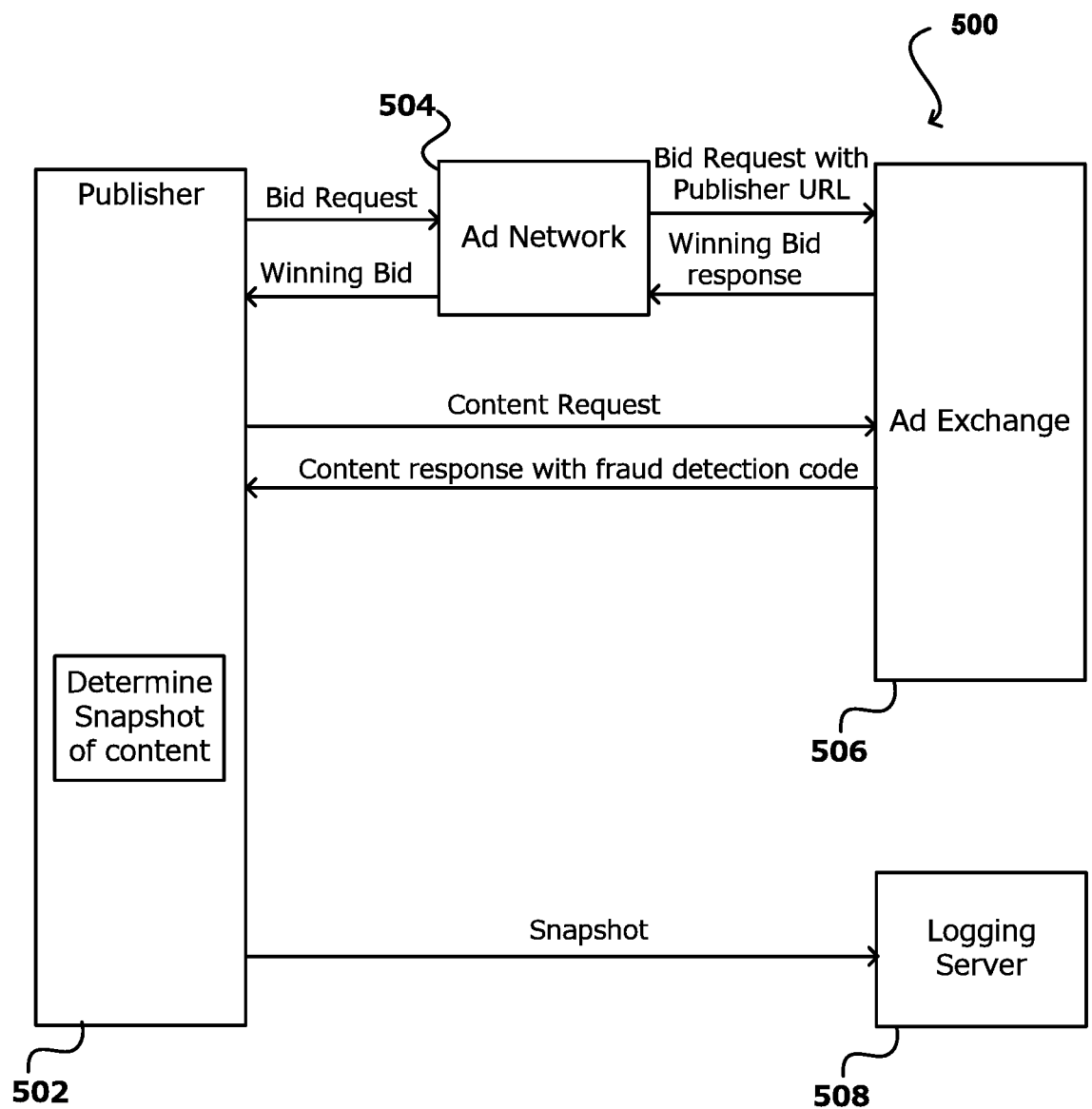
FIG. 5 illustrates an example process of utilizing a snapshot of content to determine viewability of the content in accordance with various embodiments.

FIG. 5 illustrates an example process 500 of utilizing a snapshot of content to determine viewability of the content in accordance with various embodiments. As shown, FIG. 5 includes a publisher 502, ad network 504, ad exchange 506, and logging server 508. In accordance with various embodiments, in real-time bidding (RTB), publisher 502 can integrate with an ad network 504 or ad exchange 506 to monetize one or more ad slots (e.g., a content viewing area, advertisement viewing area, etc.) on a web page of a publisher's page. An online advertising network can be a company that connects advertisers to web sites that want to host advertisements. The key function of an ad network is aggregation of ad space supply from publishers and matching it with advertiser demand. An ad exchange can be a digital marketplace that facilitates the buying and selling of media advertising inventory from multiple ad networks. Prices for the inventory are determined through bidding. In accordance with various embodiments, content publishers (e.g., publisher 502) can create opportunities for displaying electronic advertisements ("ads") with their content (e.g., web pages). Publishers can provide such opportunities independently or be represented by an advertisement network (e.g., content network 504). For example, when a user accesses a web page of a publisher, the server hosting the web page can send an advertisement request or other content request to a an advertisement exchange (e.g., auction server 506) or other such entity. This request may include information describing the web page, publisher, and/or the user such as the URL of the publisher's web page. Once the request is received by the auction server, advertisers can bid to fill that request with their advertisement and an advertisement or and/or content can be provided and displayed on the web browser.

As described, viewability is an online advertising metric that aims to track advertisements that can be seen by user. It is a crucial metric because it shows the effectiveness of an ad and therefore many advertisers are moving to a pay per viewable impression model instead of a pay per impression model. Fraudsters try to inflate viewable advertisement count by rendering invisible advertisements on a web page. For example, when an advertisement gets rendered on a web page there are several ways to make it appear invisible by manipulating the CSS style of the advertisement container. A few examples include changing the opacity of the HTML element and thus making the advertisement fully transparent or applying some three-dimensional transformation on the node so that it becomes perpendicular to the display screen of the computing device. Accordingly, in accordance with various embodiment, approaches described herein attempt to detect approaches to inflating viewable advertisement count.

In one such approach, a publisher provides a bid request through one or multiple ad networks. The ad exchange checks for traffic quality and brand safety based on the URL included in the bid call. Then the ad exchange responds back with the advertisement URL and the winning bid call. After several such bids on multiple ad exchanges if the ad provider's bid happens to be the final winner, then an advertisement call may be sent to the ad provider's ad exchange for the ad creative. The ad provider can respond with the ad markup and fraud detection script. After the advertisement has rendered completely, the fraud detection script executes and generates a snapshot of the advertisement. This can include, for example, first traversing through DOM elements inside the advertisement container to determine information on applied CSS styles on these nodes. The CSS styles for a DOM node can be determined based on the CSS rules inherited from parent nodes and the rules that have been directly applied to the node. Second, a position of each DOM node can be determined. Based on the position of each node, a layout tree can be generated. In this example, each DOM node in the layout tree is represented as a rectangle on a display screen and the size and position for each rectangle is determined based on the CSS style values determined in step two. Third, different layers of the layout tree are determined based on z-index information and transformation style for that node. Finally, each element from the layout tree is converted to a bitmap image based on the size, position and other CSS properties of the node. In this way, the bitmap image is generated using the CSS information that is available within the markup at runtime.

The snapshot is provided to an appropriate service such as logging server 508 for verification. The snapshot can be compared to stored information to determine a similarity between the snapshot image and the actual advertisement. Similarity can be based on a number of factors, as may include size, opacity, obstruction, change of color, change or orientation, among other factors. The advertisement is marked as fraudulent if the similarity value does not satisfy a similarity threshold. Such an approach provides for many advantages. For example, in Real Time Bidding (RTB), most often an impression is rendered inside a cross-domain iFrame to prevent advertiser from accessing any confidential information from the publisher web page. This provides additional security for the publishers since browser does not allow code such as JavaScript inside the iFrame to access the parent web page, but it also opens a loophole for the fraudsters to manipulate the CSS styles of the ad container, advertisement viewing area or other content viewing area to make the advertisement appear invisible to the user. Approaches described herein can generate a snapshot of the ad slot taking into account all styles that have been applied to the container. Approaches do not need access to the parent container and thus will work across all browsers and devices even when the ad slot is placed inside multiple levels of cross-domain iFrames.

Figure 6:
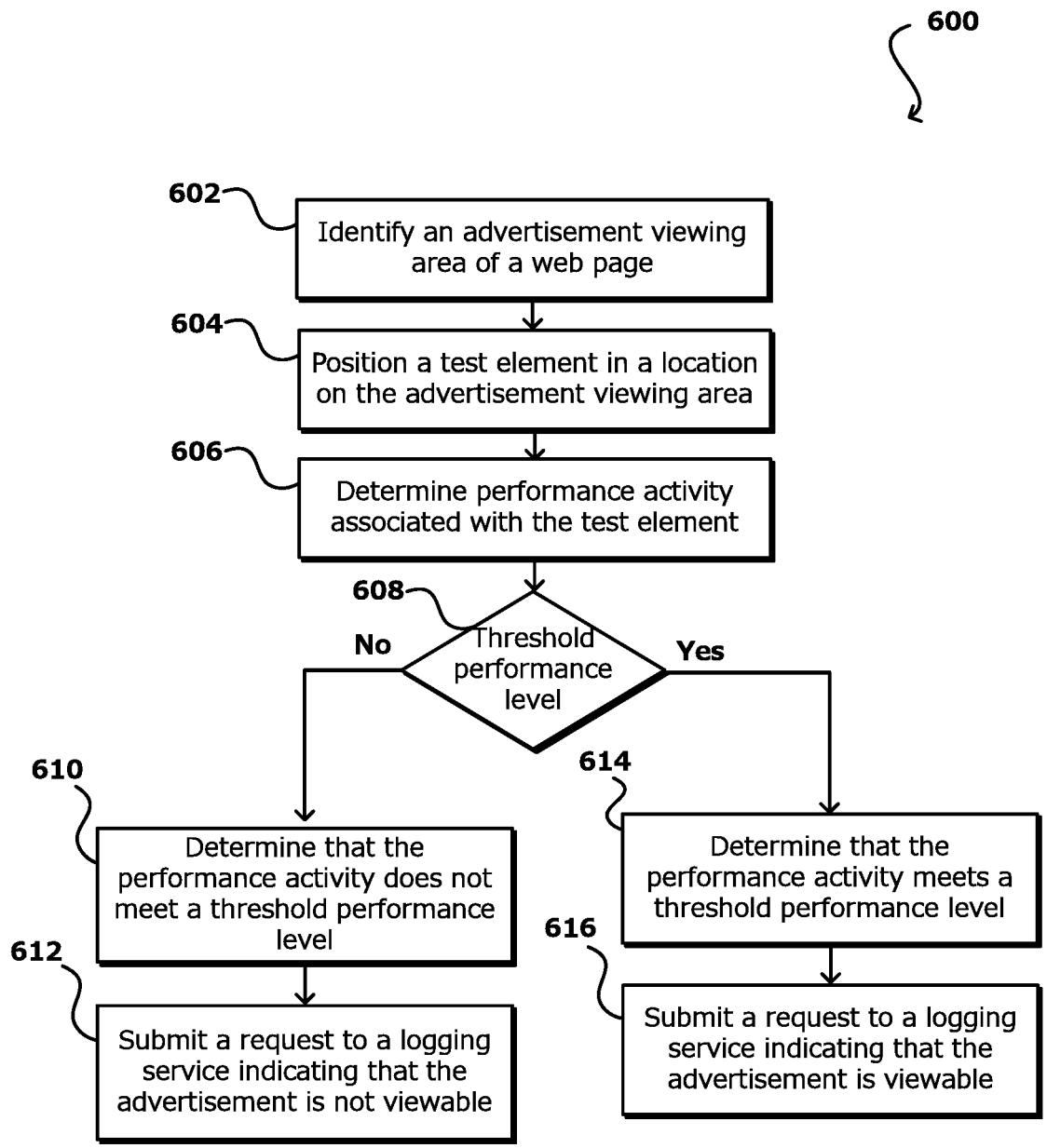
FIG. 6 illustrates an example process for determining viewability of content using a test element in accordance with various alternate embodiments.

FIG. 6 illustrates an example process 600 for determining viewability of content using a test element in accordance with various embodiments. In this example, a component operating on a computing device, a script executing on web browser, or other software code or application, can be used to determine whether content (e.g., an advertisement) is viewable. For example, an advertisement viewing area, content viewing area, ad slot, or other such area of a web page can be identified 602. The advertisement viewing area can be used to display an advertisement and/or content on the web page of a web browser. A test element can be positioned 604 in a location on the advertisement viewing area. This can include positioning a set of test elements on the content viewing area including at least a corner area of the content viewing area and a center area of the content viewing area. As the web page renders at a predetermined render rate for a period of time, performance activity, a render rate, or some other metric associated with the test element for the period of time can be determined 606. The performance activity of the test element can be compared 608 to a threshold performance level to determine viewability of the advertisement. This can include determining performance activity for each one of the set of test elements, determining that a predetermined number of the plurality of test elements is associated with a respective performance activity that meets the threshold performance level, and determining that the content item is viewable. For example, in the situation where it is determined 610 that the performance activity does not meet the threshold performance level, a request to a logging service indicating that the advertisement is not viewable can be submitted 612. In the situation where it is determined 614 that the performance activity meets the threshold performance level, a request can be submitted 616 to a logging service indicating that the advertisement is viewable. In various embodiments, this can include determining that the performance activity meets the threshold performance level for at least a predetermined period of time.

Figure 7:
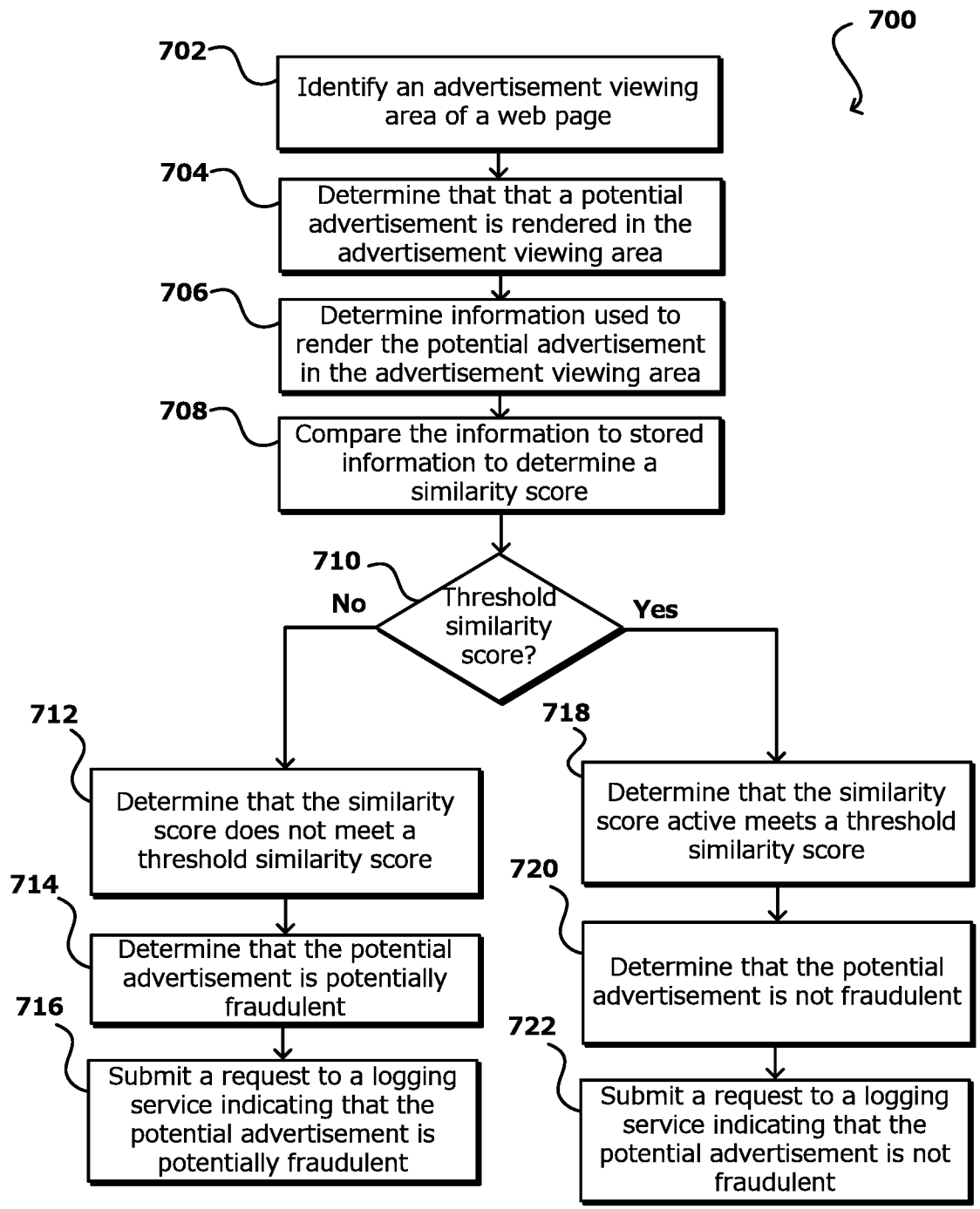
FIG. 7 illustrates an example process for utilizing a snapshot of content to determine viewability of the content in accordance with various embodiments.

FIG. 7 illustrates an example process 700 utilizing a snapshot of content to determine viewability of the content in accordance with various embodiments. In this example, a component operating on a computing device, a script executing on web browser, or other software code or application, can be used to determine whether content (e.g., an advertisement) is viewable. For example, an advertisement viewing area of a web page can be identified 702. The advertisement viewing area can be used to display a potential advertisement on the web page of a web browser. Determine 704 that the potential advertisement is rendered in the advertisement viewing area. Information used to render the potential advertisement in the advertisement viewing area can be determined 706. This can include determining that the potential content is rendered in the content viewing area, identifying a document object model corresponding to the content viewing area, the document object model including nodes organized in a tree structure, traversing the nodes of the document object model to determine information on applied cascading style sheets styles associated with the nodes, determining a position for each node in the document object model, and generating a layout tree based at least in part on the position of each node. Determining information on applied cascading style sheets styles associated with the nodes can include identifying a parent node to the nodes corresponding to the content viewing area and identify cascading style sheets styles applied to the parent node, wherein the applied cascading style sheets styles associated with the nodes is inherited from the identified cascading style sheets styles applied to the parent node. The layout tree can be used to generate an image representative of the potential content and in various embodiments the layout tree can be used to determine whether the potential content is fraudulent. For example, the image and the stored image can be compared to determine the similarity score. Factors considered in the comparison can include at least one of a size, opacity, a change of color, or a change of orientation of the image and stored image. The information can be compared 708 to stored information to determine a similarity score between the potential advertisement and a verified image of the advertisement. The similarity score can be compared 710 to a threshold similarity score to determine whether the potential advertisement is potentially fraudulent, wherein a fraudulent advertisement is an advertisement that is made to appear invisible on the web page and reported as viewable on the web page. In the situation where it is determined 712 that the similarity score does not meet a threshold similarity score, it can be determined 714 that the potential advertisement is potentially fraudulent and a request to a logging service indicating that the potential advertisement is potentially fraudulent can be submitted 716. Thereafter, a number of instances of potentially fraudulent advertisement can be determined and compared to a threshold. In the situation where the number of instances meets a threshold, the display of the advertisement can be considered fraudulent. In the situation where it is determined 718 that the similarity score meets a threshold similarity score, it can be determined 720 that the potential advertisement is not fraudulent and a request to a logging service indicating that the potential advertisement is not fraudulent can be submitted 722.

Figure 8:
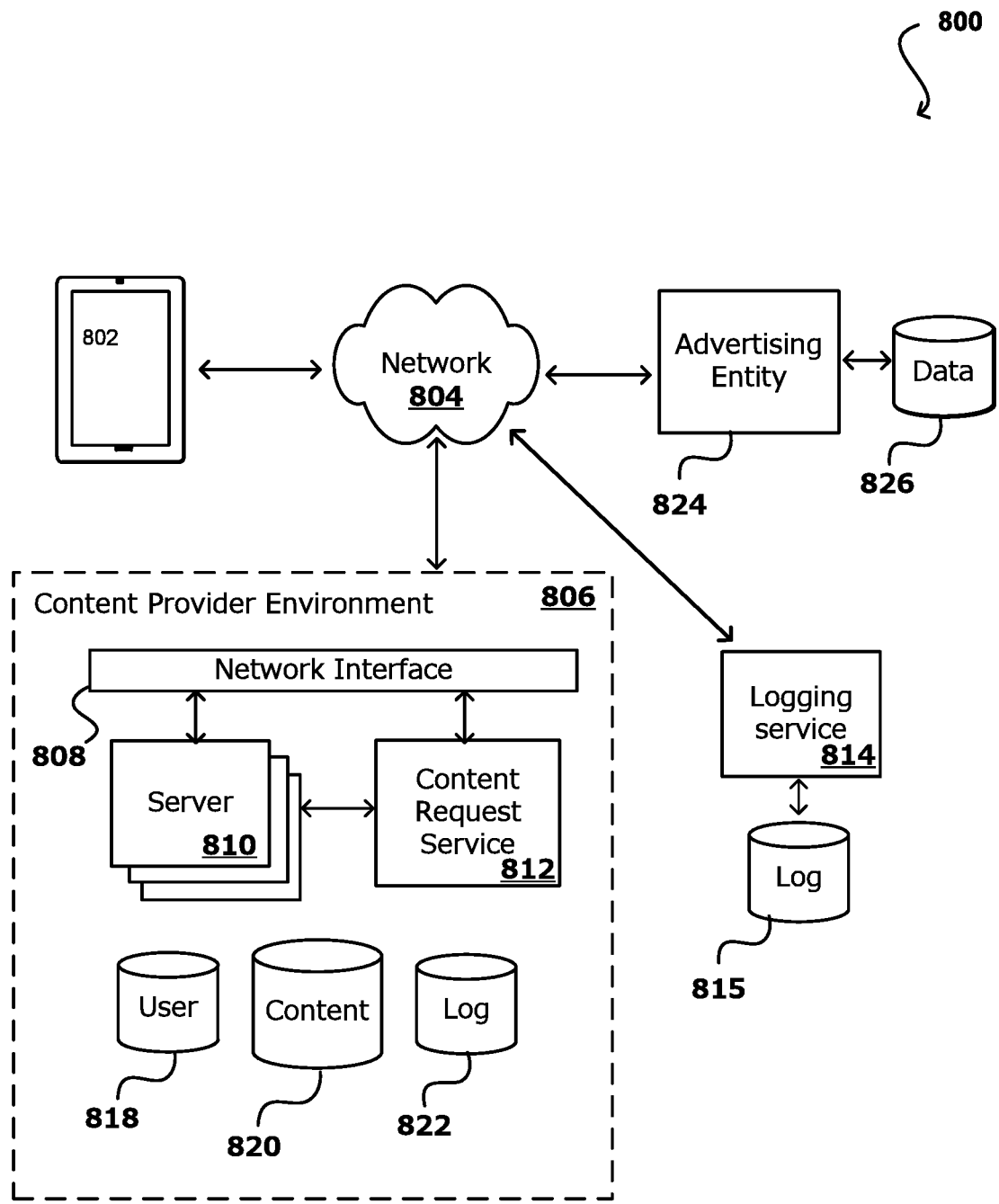
FIG. 8 illustrates an example environment in which aspects of the various embodiments can be implemented.

FIG. 8 illustrates an example environment 800 in which various embodiments can be implemented. In this example, a user is able to use a computing device 802 to submit a request for content, such as a Web page or electronic book, across at least one network 804. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others. The at least one network 804 can include any appropriate network, such as may include the Internet, an Intranet, a local area network (LAN), a cellular network, and the like. The request can be sent to an appropriate content provider environment 806, which can provide one or more services, systems, or applications for processing such requests.

In this example, the request is received to a network interface layer 808 of the content provider environment 806. The network interface layer can include any appropriate components known or used to receive requests from across a network, such as may include one or more application programming interfaces (APIs) or other such interfaces for receiving such requests. The network interface layer 808 might be owned and operated by the provider, or leveraged by the provider as part of a shared resource or "cloud" offering. The network interface layer can receive and analyze the request from the client device 802, and cause at least a portion of the information in the request to be directed to an appropriate system or service, such as a server 810 (e.g., a Web server or application server), among other such options. In the case of Web pages, for example, at least one server 810 might be used to generate code and send content for rendering the requested Web page. In cases where processing is to be performed, such as to generate search results, perform an operation on a user input, verify information for the request, etc., information might also be directed to at least other server 810 for processing. The servers or other components of the environment might access one or more data stores, such as a data store 818 that contains information about the various users, and one or more content repositories 820 storing content able to be served to those users.

Once the appropriate components of the content provider environment 806 have determined the appropriate information, a response can be returned to the client device 802 over the network. This can include any relevant content, as well as code and/or script for rendering the content. As discussed, if an advertisement is to be included with the display of content, the code can also include code, links, or other information for obtaining the advertisement. As discussed, this can include code for controlling display properties of the advertisement, as well as a call to one or more advertising entities 824 to obtain information for the advertisement, as may include text and/or image information stored in at least one data store 826. Where the advertisement is to be provided from an advertising entity, a browser application on computing device 802 in some embodiment can be used to submit a request to the advertising entity 824 across the network, which can return a response including the image, text, or other information for the advertisement(s) to be displayed. The request can include any appropriate information for selecting an advertisement to display as known in the art for such purposes. In some embodiments, the script on the page can cause a request to be submitted to an advertisement request service 812, or other such component, that can communicate with the advertising entity 824 and then package the active script with the advertising content for submission to the computing device 802. In other embodiments, the advertising and script will be determined by the advertisement request service 812 when the page is rendered, and the information will all be sent together to the computing device 802. In at least some embodiments, the advertisement request service is configured to first determine whether the user and/or computing device has opted in to, or out of, the tracking of client side metrics before including the active script with the advertisement response.

When the page of content and any advertisements are loaded, and when the active script on the page is executed, the active script executing on the client device 802 can analyze the properties of the page displayed to determine fraudulent activity as it relates to whether content has been viewed, or at least displayed with the opportunity of being viewed. For example, the script can identify an advertisement displayed on the display screen of the computing device; identify a plurality of interest points of an area that includes the content item; determine, for each interest point of the plurality of interest points, a display value, the display value corresponding to one of the advertisement or content other than the advertisement; determine a visibility metric of the advertisement based at least in part on the display value for each interest point; and determine whether the advertisement is viewable based at least in part on the visibility metric. In another example, a test element can be positioned in a location on the advertisement viewing area. As the web page renders, performance activity associated with the test element can be determined. The performance activity can be compared to a threshold performance level to determine viewability of the advertisement. In yet another example, information used to render a potential advertisement in the advertisement viewing area can be determined. The information can be compared to stored information to determine a similarity score between the potential advertisement and a verified image of the advertisement. The similarity score can be compared to a threshold similarity score to determine whether the potential advertisement is potentially fraudulent. In the situation where it is determined that the similarity score does not meet a threshold similarity score, it can be determined that the potential advertisement is potentially fraudulent. In the situation where it is determined that the similarity score meets a threshold similarity score, it can be determined that the potential advertisement is not fraudulent. Various other approaches can be used as well within the scope of the various embodiments.

The script can then cause at least one call or request to be submitted to a least one logging service 814, within or outside the provider environment 806, where the call or request included information about the visibility of the advertising and/or the presence of ad-blocking software, among other such options. In some embodiments the information can be a true/false value or similar indicator of whether ad blocking is active on the client. The information can then be stored to a log database 815 or similar location for subsequent analysis. In some cases, the information in the log data store will periodically be pulled and transformed to a format that can be stored to a table in the user data store, or other data repository or data store 822, for reporting or statistical analysis with other data, enabling various types of reporting and analysis to be performed across various types of data. In various embodiments, the data store can be analyzed to determine a number of instances of potentially fraudulent advertisement can be determined and compared to a threshold. In the situation where the number of instances meets a threshold, the display of the advertisement can be considered fraudulent. Such actions can include a review of the publisher, restricting the delivery of advertisements, among other such actions.

Figure 9:
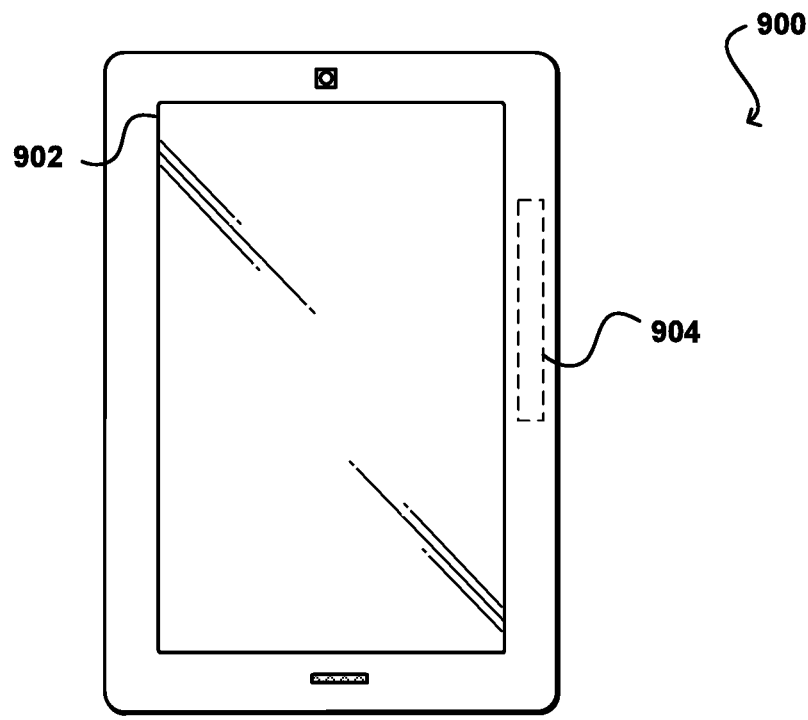
FIG. 9 illustrates an example computing device that can be used to implement aspects of the various embodiments.

FIG. 9 illustrates an example electronic user device 900 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 900 has a display screen 902 on the front side, which under normal operation will display information to a user facing the display screen (e.g., on the same side of the computing device as the display screen). It should be understood that computing devices such as servers, however, may not have dedicated display elements. The example computing device 900 also includes at least one networking component 904, such as a network interface card, wireless networking component, and the like, enabling the computing device to communicate information over at least one network.

Figure 10:
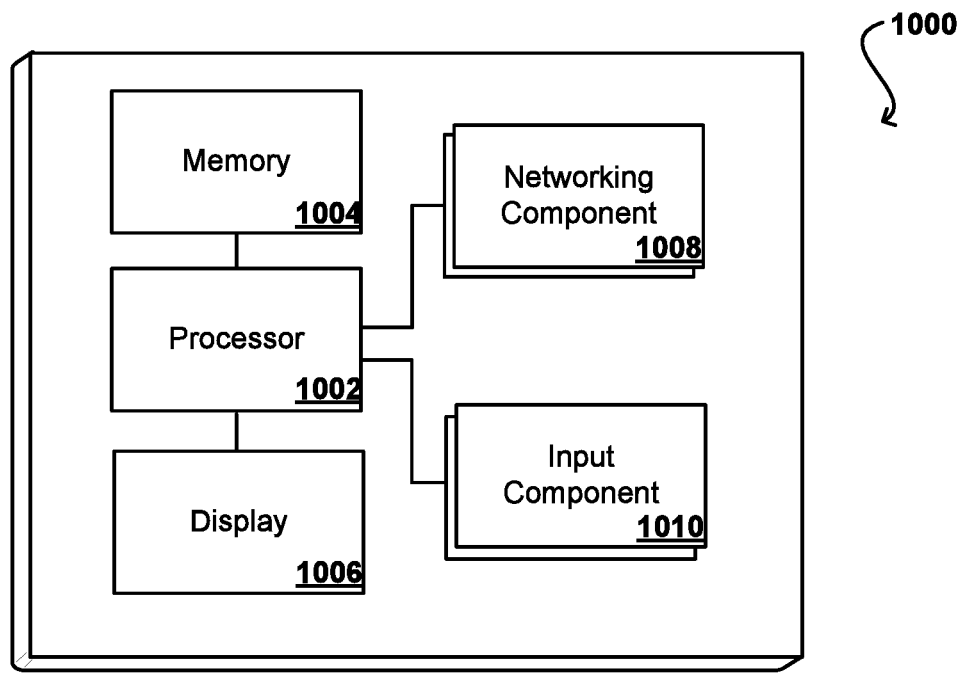
FIG. 10 illustrates example components of a computing device such as that illustrated in FIG. 9.

FIG. 10 illustrates a logical arrangement of a set of general components of an example computing device 1000 such as the device 900 described with respect to FIG. 9. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. In some embodiments, the computing device 1000 of FIG. 10 can include one or more networking and/or communication elements 1008, such as a Wi-Fi, Bluetooth, RF, wired, or wireless communication system. The device in many embodiments can communicate with a network, such as the Internet, and may be able to communicate with other such devices. In some embodiments the device can include at least one additional input component 1010 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
an ad exchange computing device having at least one processor; and
a memory device including instructions that, when executed by the at least one processor, cause the computing system to:
receive a request, from a client device having one or more client device processors and in communication with the ad exchange computing device, for an advertisement from the client device; and
provide the advertisement and a fraud detection script to the client device, the fraud detection script configured to cause the one or more client device processors to:
identify an advertisement viewing area of a web page, the advertisement viewing area used to display the advertisement on the web page of a web browser;
position a test element in a location on the advertisement viewing area;
determine, as the web page renders at a predetermined render rate for a period of time, a render rate of the test element for the period of time;
compare the render rate of the test element to a threshold render rate, the threshold render rate being based at least in part on the predetermined render rate;
determine viewability of the advertisement;

determine that the render rate does not meet the threshold render rate; and submit a request to a logging service indicating that the advertisement is not viewable.

2. The computing system of claim 1, wherein, to determine viewability of the advertisement, the fraud detection script is further configured to:

determine that the rate meets the threshold render rate; and submit a request to a logging service indicating that the advertisement is viewable.

3. A computing device, comprising:

at least one processor; and a memory device including instructions that, when executed by the at least one processor, cause the computing device to:

receive a request for an advertisement from a client device having one or more client device processors; and provide the advertisement and a fraud detection script to the client device, the fraud detection script configured to cause the one or more client device processors to:

identify a content viewing area of a web page, the content viewing area used to display the content on the web page of a web browser;

position a test element in the content viewing area;

determine, for a predetermined period of time and as the web page is rendered, performance activity associated with the test element;

determine a visibility metric based on a comparison of the performance activity to a threshold performance level;

determine whether a content item positioned in the content viewing area is viewable during at least the predetermined period of time based at least in part on the visibility metric;

determine that the performance activity does not meet the threshold performance level; and submit a request to a logging service indicating that the content item is not viewable.

4. The computing device of claim 3, wherein, to position the test element, the fraud detection script is further configured to:

position a set of test elements on the content viewing area including at least a corner area of the content viewing area and a center area of the content viewing area.

5. The computing device of claim 4, wherein, to determine whether the content item positioned in the content viewing area is viewable, the fraud detection script is further configured to:

determine performance activity for each one of the set of test elements;

determine that a predetermined number of the plurality of test elements is associated with a respective performance activity that meets the threshold performance level; and determine that the content item is viewable.

6. The computing device of claim 3, wherein the fraud detection script is further configured to:

determine that the performance activity meets the threshold performance level; and determine that the content item is viewable during at least the predetermined period of time.

7. The computing device of claim 6, wherein the fraud detection script is further configured to:

submit a request to a logging service indicating that the content item is viewable.

8. The computing device of claim 6, wherein, to determine that the performance activity meets the threshold performance level, the fraud detection script is further configured to:

determine that the performance activity meets the threshold performance level for at least a predetermined period of time.

9. The computing device of claim 3, wherein, to determine the performance activity, the fraud detection script is further configured to:

monitor activity of a graphical processing unit (GPU) used to render the test element; and analyze the activity to determine the performance activity associated with the test element.

10. The computing device of claim 3, wherein the test element includes a HyperText Markup Language (HTML) element associated with a set of style properties, and wherein the content item corresponds is an advertisement.

11. The computing device of claim 3, wherein, to determine the visibility metric, the fraud detection script is further configured to:

identify the content item;

identify a plurality of interest points of the content viewing area;

determine, for each of the plurality of interest points, a display value corresponding to the content item;

determine a second visibility metric of the content item based at least in part on the display value for each interest point; and determine a combined visibility metric based at least in part on the visibility metric and the second visibility metric.

12. The computing device of claim 11, wherein, to determine the second visibility metric, the fraud detection script is further configured to:

determine a set of interest points associated with a display value corresponding to the content; and calculate a ratio of the set of interest points and a total number of the plurality of interest points.

13. The computing device of claim 3, wherein the fraud detection script is further configured to:

request the content item; and receive the content item and a script, the script being configured to obtain the performance activity used to determine the visibility metric.

14. A computer-implemented method, comprising:

identifying, via a fraud detection script deployed, by an ad exchange computing device in communication with a client device, in response to a request for content and executed by one or more processors of the client device, a content viewing area of a web page, the content viewing area used to display the content on the web page of a web browser executing on the client device;

positioning, via the fraud detection script, a test element in the content viewing area;

determining, via the fraud detection script, for a predetermined period of time and as the web page is rendered, performance activity associated with the test element;

determining, via the fraud detection script, a visibility metric based on a comparison of the performance activity to a threshold performance level;

determining, via the fraud detection script, that the content item positioned in the content viewing area is viewable during at least the predetermined period of time based at least in part on the visibility metric;

determining that the performance activity does not meet the threshold performance level; and submitting a request to a logging service indicating that the content item is not viewable.

15. The method of claim 14, wherein positioning the test element further includes:

positioning a set of test elements on the content viewing area including at least a corner area of the content viewing area and a center area of the content viewing area.

16. The method of claim 15, wherein determining whether the content item positioned in the content viewing area is viewable further includes:

determining performance activity for each one of the set of test elements;

determining that a predetermined number of the plurality of test elements is associated with a respective performance activity that meets the threshold performance level; and determining that the content item is viewable.

17. The method of claim 14, wherein determining the performance activity further includes:

monitoring activity of a graphical processing unit (GPU) used to render the test element; and analyzing the activity to determine the performance activity associated with the test element.

* * * * *